United States Patent
Vossiek et al.

(10) Patent No.: US 11,016,169 B2
(45) Date of Patent: May 25, 2021

(54) METHOD AND SYSTEM FOR REDUCING INTERFERENCE CAUSED BY PHASE NOISE IN A RADAR SYSTEM

(71) Applicant: Symeo GmbH, Neubiberg (DE)

(72) Inventors: Martin Vossiek, Fürth (DE); Michael Gottinger, Buckenhof (DE); Fabian Kirsch, Erlangen (DE); Peter Gulden, Erding (DE)

(73) Assignee: Symeo GmbH, Neubiberg (DE)

( * ) Notice: Subject to any disclaimer, the term of this patent is extended or adjusted under 35 U.S.C. 154(b) by 158 days.

(21) Appl. No.: 16/067,770

(22) PCT Filed: Jan. 3, 2017

(86) PCT No.: PCT/EP2017/050056
§ 371 (c)(1),
(2) Date: Jul. 2, 2018

(87) PCT Pub. No.: WO2017/118621
PCT Pub. Date: Jul. 13, 2017

(65) Prior Publication Data
US 2019/0004145 A1  Jan. 3, 2019

(30) Foreign Application Priority Data

Jan. 4, 2016 (DE) .................... 10 2016 100 107.4

(51) Int. Cl.
*G01S 13/87* (2006.01)
*G01S 7/02* (2006.01)
(Continued)

(52) U.S. Cl.
CPC .............. *G01S 7/023* (2013.01); *G01S 7/354* (2013.01); *G01S 7/4021* (2013.01); *G01S 13/878* (2013.01)

(58) Field of Classification Search
CPC ........ G01S 7/023; G01S 7/354; G01S 7/4021; G01S 13/878
See application file for complete search history.

(56) References Cited

U.S. PATENT DOCUMENTS 5,191,344 A   3/1993  Moreira
5,784,022 A   7/1998  Kuepfer
(Continued)

FOREIGN PATENT DOCUMENTS

AT     506707      11/2009
CN    1187882 A    7/1998
(Continued)

OTHER PUBLICATIONS

"International Application No. PCT/EP2017/050056, International Search Report and Written Opinion dated Mar. 30, 2017", (dated Mar. 30, 2017), 15 pgs.

(Continued)

*Primary Examiner* — Timothy A Brainard
(74) *Attorney, Agent, or Firm* — Schwegman Lundberg & Woessner, P.A.

(57) ABSTRACT

A method is described in particular for reducing interference due to phase noise in a radar system, in which in a first noncoherent transceiver unit (NKSE1) a first signal (sigTX1) is generated and transmitted, in particular emitted, via a path (SP), in a further, in particular second noncoherent transceiver unit (NKSE2), a first signal (sigTX2) is generated and transmitted, in particular emitted, via the path (SP), the signals (sigTX1 and sigTX2) are received directly or indirectly in the respective other transceiver unit and are processed further therein as received signals sigRX12 and sigRX21, in the first transceiver unit (NKSE1), a comparison signal (sigC12) is formed from its first signal (sigTX1)

(Continued)

and from such a first signal (sigRTX2) received from the further transceiver unit (NKSE2) via the path (SP), and in the further transceiver unit (NKSE2), a further comparison signal (sigC21) is formed from its first signal (sigTX2) and from such a first signal (sigTX1) received from the first transceiver unit (NKSE1) via the path (SP), wherein the further comparison signal (sigC21) is transmitted, in particular communicated, from the further transceiver unit (NKSE2) to the first transceiver unit (NKSE1), wherein in a first step, deviations of the signals sigC21 and sigC12 which are induced by systematic deviations in the transceiver units (NKSE2, NKSE1), are compensated for, wherein in a second step, at least one complex value from a first of the two comparison signals or from a signal which was derived from this first comparison signal is used for the purpose of adapting at least one complex value of the second of the two comparison signals or a value of a signal which was derived from the second comparison signal, and thus to form a signal (sigCC), wherein the adaptation takes place such that by a mathematical operation, the vector sum or the difference of the complex values is formed or the sum or the difference of the phases of the complex values is formed.

20 Claims, 2 Drawing Sheets

(51) Int. Cl.
  *G01S 7/40*   (2006.01)
  *G01S 7/35*   (2006.01)

(56) References Cited

U.S. PATENT DOCUMENTS

| | | | |
|---|---|---|---|
| 5,861,845 | A | 1/1999 | Lee et al. |
| 6,127,966 | A | 10/2000 | Erhage |
| 6,317,075 | B1 | 11/2001 | Heide et al. |
| 7,940,743 | B2 | 5/2011 | Seisenberger et al. |
| 8,108,558 | B2 | 1/2012 | Kirsch et al. |
| 8,299,959 | B2 | 10/2012 | Vossiek et al. |
| 2001/0004601 | A1 | 6/2001 | Drane et al. |
| 2005/0030935 | A1 | 2/2005 | Seisenberger et al. |
| 2005/0170797 | A1* | 8/2005 | Seisenberger ....... G06K 7/0008 455/141 |
| 2006/0049961 | A1* | 3/2006 | Deck ............... G05B 19/042 340/870.07 |
| 2007/0290916 | A1 | 12/2007 | Ofek |
| 2008/0088499 | A1* | 4/2008 | Bonthron ............. G01S 13/931 342/104 |
| 2014/0022111 | A1 | 1/2014 | Kuehnle et al. |
| 2014/0120966 | A1* | 5/2014 | Fischer ................ H04W 16/14 455/500 |
| 2017/0149518 | A1* | 5/2017 | Hartlmueller ..... H04L 12/40032 |
| 2017/0176583 | A1* | 6/2017 | Gulden .................. G01S 13/34 |

FOREIGN PATENT DOCUMENTS

| | | |
|---|---|---|
| DE | 10157931 C2 | 12/2003 |
| DE | 102005000732 A1 | 7/2006 |
| DE | 102008010536 | 8/2009 |
| DE | 102008010536 A1 | 8/2009 |
| DE | 102012212888 | 1/2014 |
| DE | 102014104273 | 10/2015 |
| DE | 102009030075 A1 | 12/2020 |
| EP | 2602636 A1 | 6/2013 |
| JP | 2005510947 A | 4/2005 |
| JP | 2008527339 A | 7/2008 |
| WO | WO-2003047137 | 6/2003 |
| WO | Wo-2010019975 A1 | 2/2010 |
| WO | WO-2017118621 | 7/2017 |

OTHER PUBLICATIONS

"International Application No. PCT/EP2017/050056, International Preliminary Report on Patentability dated Jul. 19, 2018", (dated Jul. 19, 2018), 13 pgs.
"U.S. Appl. No. 15/129,404, Final Office Action dated Jan. 15, 2019", 13 pgs.
"U.S. Appl. No. 15/129,404, Final Office Action dated Jun. 27, 2019", 14 pgs.
"U.S. Appl. No. 15/129,404, Non Final Office Action dated Apr. 13, 2020", 14 pgs.
"U.S. Appl. No. 15/129,404, Non Final Office Action dated Jul. 9, 2018", 15 pgs.
"U.S. Appl. No. 15/129,404, Notice of Allowance dated Nov. 23, 2020", 7 pgs.
"U.S. Appl. No. 15/129,404, Preliminary Amendment dated Jul. 28, 2017", 9 pgs.
"U.S. Appl. No. 15/129,404, Preliminary Amendment dated Sep. 26, 2016", 12 pgs.
"U.S. Appl. No. 15/129,404, Response dated Mar. 24, 2020 to Final Office Action dated Jun. 27, 2019", 12 pgs.
"U.S. Appl. No. 15/129,404, Response dated Jun. 14, 2019 to Final Office Action dated Jan. 15, 2019", 11 pgs.
"U.S. Appl. No. 15/129,404, Response dated Oct. 12, 2020 to Non Final Office Action dated Apr. 13, 2020", 14 pgs.
"U.S. Appl. No. 15/129,404, Response dated Nov. 9, 2018 to Non Final Office Action dated Jul. 9, 2018", 11 pgs.
"Chinese Application Serial No. 201580026040,6, Office Action dated Aug. 3, 2018", 10 pgs.
"English translation of description of WO2010019975", (2010), 10 pgs.
"German Application Serial No. 102014104273.5, Search Report dated Nov. 17, 2014", 8 pgs.
"Indian Application Serial No. 201617032382, First Examination Report dated Jun. 24, 2020", 7 pgs.
"International Application Serial No. PCT/DE2015/100119, International Preliminary Report on Patentability dated Oct. 6, 2016", 12 pgs.
"International Application Serial No. PCT/DE2015/100119, International Search Report dated Sep. 22, 2015", 5 pgs.
"Japanese Application Serial No. 2017-501462, Decision of Refusal dated Jan. 31, 2020", 8 pgs.
"Japanese Application Serial No. 2017-501462, Office Action dated Feb. 26, 2019", 4 pgs.
"Japanese Application Serial No. 2018-534784, Notification of Reasons for Refusal dated Dec. 7, 2020", w/ English Translation, 4 pgs.
Feger, R, et al., "A 77-GHz Cooperative Secondary Radar System for Local Positioning Applications", 2012 IEEE/MTT-S International Microwave Symposium Digest, (2012), 3 pgs.
Feger, R, et al., "A 77-GHz FMCW MIMO Radar Based on Loosely Coupled Stations", 7th German Microwave Conference, (2012), 4 pgs.
Kong, Sunwoo, et al., "Wireless Cooperative Synchronization of Coherent UWB MIMO Radar", IEEE Transactions on Microwave Theory and Techniques, vol. 62, No. 1 (Jan. 1, 2014), 154-165
Miesen, et al., "UHF RFID Localization Based on Synthetic Apertures", IEEE Transactions on Automation Science and Engineering, 1 0(3), (2013), 807-815.
Scheiblhofer, Stefan, et al., "Performance Analysis of Cooperative FMCW Radar Distance Measurement Systems", 2008 IEEE MTT-S International Microwave Symposium Digest, (Jun. 15, 2008), 121-124.
Stelzer, et al., "Precise Distance Measurement with Cooperative FMCW Radar Units", IEEE Radio and Wireless Symposium, (2008), 771-774.
Vossiek, et al., "Inverse Synthetic Aperture Secondary Radar Concept for Precise Wireless Positioning", IEEE Transactions on Microwave Theory and Techniques, 55(11 ), (2007), 2247-2453.

(56) References Cited

OTHER PUBLICATIONS

Xu, Renhui, et al., "Survey on the Radar-Based Communication System", [Online] Retrieved from the Internet: <URL: http://wvvw.researchgate.netipublicati0n/268802143>, (2014), 11 pgs.

* cited by examiner

METHOD AND SYSTEM FOR REDUCING INTERFERENCE CAUSED BY PHASE NOISE IN A RADAR SYSTEM

PRIORITY CLAIM TO RELATED APPLICATIONS

This application is a U.S. national stage filing under 35 U.S.C. § 371 from International Application No. PCT/EP2017/050056, filed on 3 Jan. 2017, and published as WO2017/118621 on 13 Jul. 2017, which claims the benefit under 35 U.S.C. 119 to German Application No. 10 2016 100 107.4, filed on 4 Jan. 2016, the benefit of priority of each of which is claimed herein, and which applications and publication are hereby incorporated herein by reference in their entirety.

PRIOR ART AND AREA OF APPLICATION

The invention describes a method for processing radio signals, which are emitted, in particular radiated, by at least two noncoherent transceiver units NKSE1 and NKSE2, and are each transmitted to another NKSE and received therein. The at least two transceiver units are equipped in this case with at least partially independent devices for signal generation (signal sources). The independent signal generation has the result that the generated signals of the different NKSE initially do not have a defined phase relationship to one another, i.e., are not coherent in relation to one another.

Distributed radar systems can in this case be systems having at least two NKSE, between which the signals are transmitted on an indirect connection (reflected at objects, scattering bodies, or boundary layers) or on a direct path (via a line-of-sight connection) from at least one transmitter to at least one receiver. The radar networks can be used to image an object scene and/or detect properties such as velocity or distance or the pose of objects using multiple NKSE. However, the radar networks can also be used to determine the distance or the pose or the relative velocity of multiple NKSE in relation to one another. In the first case, one frequently refers to primary radar systems and in the second case, one refers to secondary radar systems or radio locating systems.

In radar systems, one seeks the largest possible spatial aperture to achieve a good angle resolution. The term aperture identifies in this case an area or a spatial region on or in which multiple individual antennas are arranged—or a single antenna is moved to multiple locations, respectively, and the signals of the individual antennas are combined during transmission to form a sum signal and/or are combined after reception. It is important in conjunction with the present invention that the signals are combined coherently, i.e., with defined phase relation. The combination of the transmitted and/or received signals can be performed physically by superposition of waves or by computer after the reception of the signals. Reference is often also made in this context to so-called aperture synthesis methods or methods using synthetic aperture. Such aperture arrangements are also known under the terms MIMO, SIMO, or MISO. MIMO (multiple input, multiple output) refers in communication engineering or radar technology to a method and/or a transmission system for using multiple transmitting and receiving antennas. In a MIMO system, transmitter and receiver have multiple antennas; in a SIMO system (single input, multiple output), the transmitter has one antenna and the receiver has many antennas, and in MISO (multiple input, single output), the transmitter has many antennas and the receiver only has one antenna.

If one wishes to synthesize a large aperture using multiple antenna elements, it is thus increasingly problematic with increasing aperture size to distribute signals having high frequencies coherently within these arrangements. A combination of distributed arrangements either by synchronization at a lower frequency level or by means of postprocessing is therefore desired. The at least partially separate generation of the high-frequency signals is thus enabled, ideally, completely independent submodules can be used. However, technical difficulties thus arise in the area of the synchronization of the distributed units and an increased interfering influence of the phase noise arises.

In the case of distributed radar systems, the requirement exists in any case, because of the allocation to at least two noncoherent (in relation to the respective other transceiver unit) transceiver units (NKSE) located separately, to compensate for the influences of the at least partially independent signal generation sources, in particular to the synchronization and the phase noise component, in the at least two NKSE. Completely independent generation of the high-frequency signals is provided if the system clock in each NKSE is locally generated, for example, using a high-frequency oscillator or using a quartz oscillator or a MEMS oscillator in conjunction with a high-frequency oscillator and a phase-locked loop. A partially independent generation of the high-frequency signals is, for example, the distribution of a common, lower-frequency system clock or a reference signal between the NKSE, from which the high-frequency signal is subsequently generated or derived by means of phase-locked loop, by multiplication, or by other frequency-comparing mechanisms.

A first approach to achieve synchronization and reduce the influence of the phase noise is described hereafter. In this case, at least two NKSE transmit and receive (approximately) at the same time via the same, reciprocal radio channel in the full-duplex method. The transmitted and received signals are each mixed with one another and thus a comparison signal is formed in each of the at least two NKSE. Because of the mutual and (nearly) simultaneous transmission, the phase noise of both signal sources is contained in each of the comparison signals (also referred to as mixed signals, intermediate frequency signals, or beat signals). The data of at least one of the comparison signals, after it has been sampled by an A/D converter, are transmitted to the other unit, so that both comparison signals are provided in this NKSE. By way of a correlation or multiplication of these two comparison signals to form a so-called comparison-comparison signal, the influence of the phase noise can be strongly suppressed and a coherent measurement can be enabled. According to this procedure, it is also possible to measure velocities which can be detected by Doppler shift of the carrier frequency using such a system.

In the prior art, interference occurs in particular in the case of radar signals having multiple signal components, i.e., in the case of signals which comprise multiple targets or multiple signal transmission paths. The achievable accuracy and range is reduced in this way. Moreover, the computing effort is high.

The object of the invention is to propose a method and system for reducing interference due to phase noise in a radar system, which avoid the mentioned disadvantages. In particular, interference is to be reduced with the least possible computing effort.

This object is achieved by a method having the features according to claim 1 and a corresponding system and a corresponding use. Advantageous embodiments are the subject matter of dependent claims in particular.

The subject matter of the invention are methods, using which the signals transmitted between the NKSE are processed such that comparison signals result, which have advantageous properties, which otherwise only radar signals actually have, which operate using only one shared device for signal generation, i.e., using a coherent signal source. The subject matter of the invention are in particular methods for reducing interfering effects which are induced by the non-correlated phase noise of the multiple independent devices for signal generation. The method is particularly advantageously applicable to distributed radar systems, so-called radar networks.

In the field of radar signal processing, one wishes to convert the received signals into an intermediate frequency signal having the lowest possible noise, in order to achieve a high accuracy and long range. It is to be presumed in this case that there are multiple propagation paths between transmitter and receiver. In principle, it is possible to suppress the received multipath propagations and correlated noise components by bandpass filtering using a filter tuned exactly to the frequency to be expected. However, in practice this method can be carried out poorly, since synchronization errors of the sampling times and the local oscillator frequencies in the respective NKSE only permit an accurate prediction of the beat signals generated after the mixing procedure to a restricted extent. Because of these problems, the correlation of the phase noise of these two signals is reduced and the estimation error of the phase increases.

Therefore, methods having computation steps in which the influences of phase noise and synchronization errors are reduced or completely suppressed are advantageous.

The method according to the invention begins in that at least two NKSE transmit nearly simultaneously. Nearly simultaneously in this context means that the transmitted signals sigTX1 and sigTX2 are transmitted for a large part of their signal duration in both directions, i.e., sigTX1 from n1 to NKSE2 and sigTX2 from NKSE2 to NKSE1. The initially unknown difference of the starting times of the transmitted signals sigTX1 and sigTX2 is referred to as T_off. The most equal possible transmission times are desired, the shift T_off is preferably not to be greater than half of the signal duration, but in any case less than the signal duration. In this case, because of the at least partially independent generation, the signals sigTX1 and sigTX2 have non-correlated signal components, which are to be attributed to the phase noise of the signal sources in the stations NKSE1 and NKSE2.

In such an arrangement, preferably the same antennas are used for transmitting (Tx) and receiving (Rx), to ensure the reciprocity of the transmission channels. In arrangements in an array (for example, in the case of MIMO), it is to be ensured that preferably at least one of the transmission paths is reciprocal. The use of a transmission mixer in at least one transmitting and receiving path of the NKSE is particularly suitable for achieving the reciprocity. One exemplary embodiment of a transmission mixer in a radar arrangement is described, for example, in U.S. Pat. No. 6,317,075 B1.

As a further step, the comparison signals (sigC21; sigC12) are then formed in each NKSE, specifically between the respective received signal and the transmitted signal or using a component of the transmitted signal correlated with the transmitted signal with respect to the phase noise. The method for forming these comparison signals corresponds to the procedure in patent application DE 10 2014 104 273 A1.

According to the invention, phase noise and synchronization errors are at least reduced by carrying out the processing of the received signals in two steps: as the first step, systematic deviations are corrected, either before the reception of the signals via an activation of the signal source, and/or via a compensation directly in the received signal and/or via a compensation in the comparison signal. As the second step, for example, a shortened analysis of the correlation and/or the formation of a comparison-comparison signal then takes place only for the expected shift range or in the best case in only one shift value.

In the second step, differently according to the invention than in DE 10 2014 104 273 A1, particularly advantageously no multiplication is executed for phase compensation, but rather an addition of the complex signals is used. The use of addition instead of multiplication is possible due to the above-described first step of processing, i.e., due to the prior compensation of the systematic deviations.

A multiplication or division of the signals represents a nonlinear operation. Nonlinear operations are always accompanied by nonlinear effects, i.e., here in particular by so-called inter-modulations of signal and noise components. In particular in the case of radar signals having multiple signal components, i.e., signals which comprise multiple targets or multiple signal transmission paths, this results in interference. The use proposed according to the invention of the addition of the complex signals has the great advantage that addition is a linear operation, whereby nonlinear effects, i.e., in particular inter-modulations of signal and noise components, are avoided. This embodiment variant thus generally results in a significantly better reduction of the phase noise in comparison to methods for combination of the comparison signals sigC21 and sigC12.

The phase noise/the influence of the phase noise is thus suppressed according to the invention, without the above-mentioned additional interfering influences arising, as would be expected in the case of DE 10 2014 104 273 A1. Moreover, this approach is technically advantageous, since it requires a significantly lower computing effort than the complete multiplication or correlation proposed as an embodiment in DE 10 2014 104 273 A1.

Figure 3:
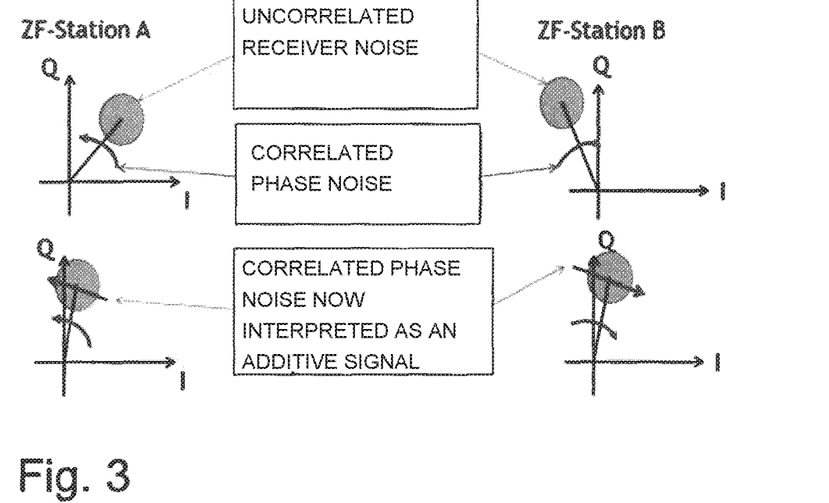
FIG. 3 shows beat signals of the two transceiver units with non-correlated noise components before the synchronization in the upper part and a synthetic mixed product having correlated phase noise after the synchronization in the lower part.

To be able to carry out the procedure according to the invention, preferably firstly a precise, either direct (via controllable software) and/or synthetic (computer) synchronization is carried out, to compensate (as extensively as possible) for the frequency offset. A linearized observation can then be used, which causes a cancellation of the correlated component of the interference only in the case of small, residual phase differences (principle illustrated in FIG. 3).

The synchronization can be carried out separately in this case before the measurement, in the scope of the measurement itself, or following the measurement. In the case of a synchronization in the scope of the measurement or following thereon, the synchronization can take place, for example, via subsequent adaptation of the comparison signal.

Means or methods can be provided for the synchronization, which are capable of adapting the clock rates of the sources of sigTX1 and sigTX2 to one another either directly (for example, by means of TCXO) or by computer (synthetic synchronization).

All known methods for equalizing clock sources in distributed stations can be used. Particularly advantageous approaches for synchronization are methods according to U.S. Pat. No. 7,940,743, according to patent application DE 102008010536, and/or the exchange of reference clocks or reference signals. A further method for clock equalization within the measurements for FMCW signals is described hereafter.

All of these methods for equalizing clock sources can be implemented either via radio waves or via cable connections. Wired can mean electrical signals or optical signals which are conducted by cables.

Alternatively or to improve the method for equalizing clock sources, very high-quality clock sources, for example, atomic clocks, can also be used.

After the step of synchronization, signals (sigEP21, sigEP12) are derived from the comparison signals, which each represent a function which has, as the function argument, the signal runtime or the length of the transmission channel of the respective signal components.

The offset T_off between the stations is then determined, for example, by the method disclosed in patent DE 101 57 931, or by a correlation of the comparison signals of the at least two NKSE. In this case, the maximum can supply the offset. Alternatively, the method described hereafter for FMCW signals can also be used. As above, the methods can be carried out in a wired manner or by means of radio waves.

At least one function value F1 is determinable from the signal sigEP21, which is to be associated with a determined runtime, and at least one further function value F2 of the signal sigEP12 is determinable, which is as much as possible to be associated with exactly the same runtime. F1 and F2 are then offset with one another. This offsetting takes place, for example, by addition or subtraction of the two runtime values.

Therefore, interference which is to be attributed to the phase noise of the signal sources due to the non-correlated signal components of the signals sigTX1 and sigTX2 is eliminated or at least reduced. The steps are summarized hereafter:

Method for reducing interference due to phase noise in a radar system, in which in a first noncoherent transceiver unit (NKSE1), a first signal (sigTX1) is generated and transmitted, in particular emitted, via a path (SP), in a further, in particular second noncoherent transceiver unit (NKSE2), a (further) first signal (sigTX2) is generated and transmitted, in particular emitted, via the path (SP), the signals (sigTX1 and sigTX2) are received directly or indirectly in the respective other transceiver unit and are processed further therein as received signals sigRX12 and sigRX21, in the first transceiver unit (NKSE1), a comparison signal (sigC12) is formed from its first signal (sigTX1) and from such a first signal (sigRTX2) received from the further transceiver unit (NKSE2) via the path (SP), and in the further transceiver unit (NKSE2), a further comparison signal (sigC21) is formed from its first signal (sigTX2) and from such a first signal (sigTX1) received from the first transceiver unit (NKSE1) via the path (SP), wherein the further comparison signal (sigC21) is transmitted, in particular communicated, from the further transceiver unit (NKSE2) to the first transceiver unit (NKSE1), wherein in a first step, deviations of the signals sigC21 and sigC12 which are induced by systematic deviations in the transceiver units (NKSE2, NKSE1), are compensated for, wherein in a second step, at least one complex value from a first of the two comparison signals or from a signal which was derived from this first comparison signal is used for the purpose of adapting at least one complex value of the second of the two comparison signals or a value of a signal which was derived from the second comparison signal, and thus to form an (adaptive) signal (sigCC), wherein the adaptation takes place such that by a mathematical operation, the vector sum or the difference of the complex values is formed or the sum or the difference of the phases of the complex values is formed.

A noncoherent transceiver unit (NKSE) is to be understood as a transceiver unit, the transmitted signal of which is noncoherent in relation to the signal of a further NKSE (even if the signal of the first NKSE or the further NKSE is coherent per se). If computations, analyses, or other method steps are carried out in the (respective) transceiver unit, this also includes a possibly physically independent analysis unit, which is connected to the transceiver unit. For example, the transceiver unit can thus be designed as an arrangement made of in particular one or multiple antenna having a few signal-generating or signal-processing components, while further components such as the signal comparison units or an analysis unit are connected as structurally independent components to such an arrangement. If components can be used, they can be formed, if technically implementable, as so-called hardware from processing components and/or can be implemented as signal or data processing steps executed entirely or partially in a processor.

In general, the optionally provided analysis unit is in particular a component of one or multiple (both) transceiver units or is connected to one or multiple (both) such transceiver units. A physically independent analysis unit can optionally be provided, which is connected to the respective transceiver unit or the remaining components of the respective transceiver unit. Alternatively, the analysis unit can optionally be integrated into the first and/or the further noncoherent transceiver unit, for example, in a shared housing and/or as a modular unit.

An exemplary embodiment will be explained in greater detail hereafter on the basis of the figures.

Figure 1:
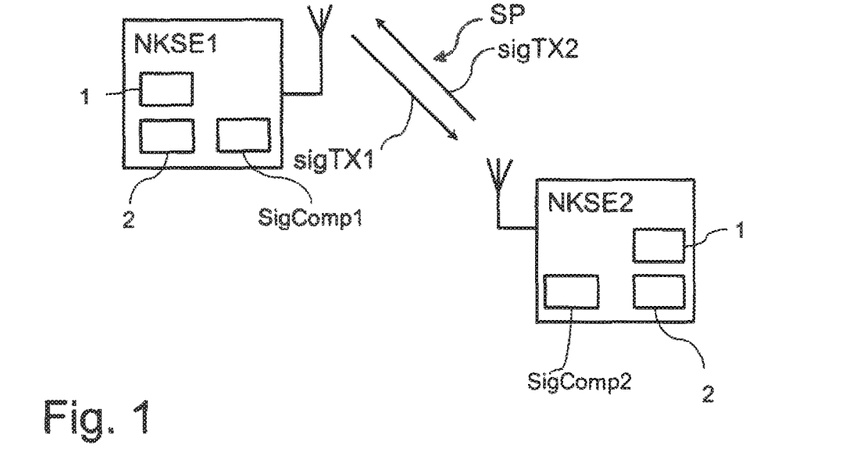
FIG. 1 shows two transceiver units communicating with one another and individual components thereof.

As is apparent from FIG. 1, two transceiver units NKSE1, NKSE2 communicate with one another via a radio interface. A first or a second signal sigTX1, sigTX2, respectively, is transmitted in this case. The transceiver units NKSE1, NKSE2 each have a signal source 1, a unit for clock adaptation or comparison signal modification 2, and a transmission comparison unit (SigComp1, SigComp2).

Figure 2:
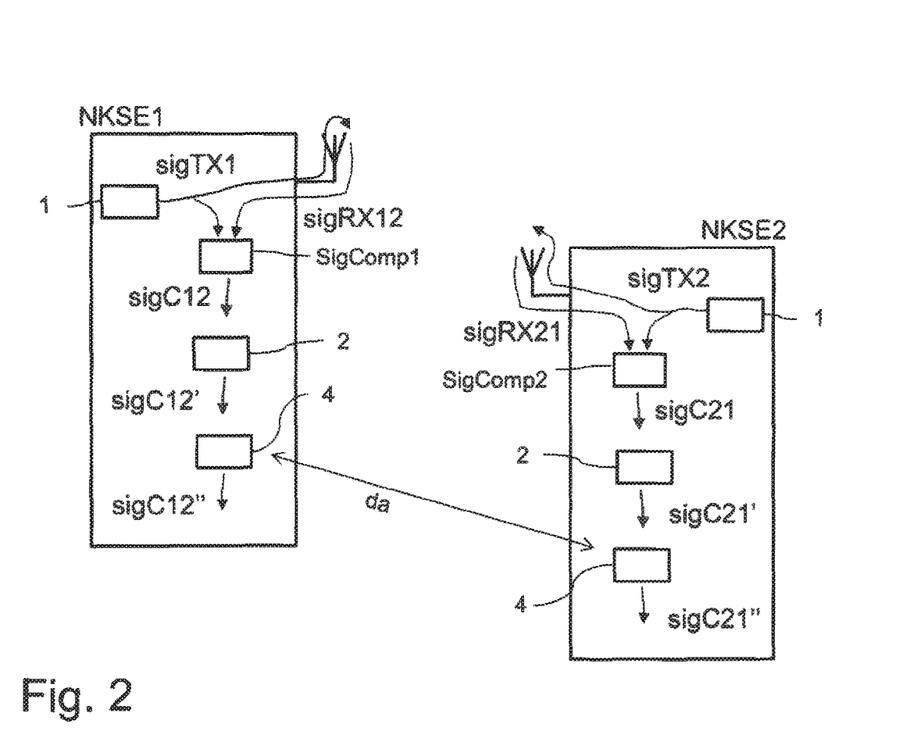
FIG. 2 shows the components from FIG. 1 with illustration of a method sequence.

FIG. 2 additionally shows a unit in each case for phase modification 4. A data exchange takes place between the two units for the phase modification 4.

The exact mathematical derivation of the invention is carried out hereafter. In a first noncoherent transceiver unit (NKSE1), a first signal (sigTX1) is generated and transmitted, in particular emitted, via a path (SP). In a further, in particular second noncoherent transceiver unit (NKSE2), a second signal (sigTX2) is generated and transmitted, in particular emitted, via the path (SP). The emission of the signals takes place in this case as simultaneously as possible, but at least adapted chronologically to one another so that the two signal forms preferably overlap over at least half of the transmission time. The signal sources can be completely or partially independent.

As is typical in communication technology, the transmitted signals used (sigTX1, sigTX2) can be represented as a decomposition into an equivalent baseband signal (bbTX1) and a carrier signal.

Since the system according to the invention is preferably to be used for distance measurement and/or for imaging, signals having so-called good correlation properties are preferably used as the baseband signals. Signals having good correlation properties are, for example, broadband pulses, noise signals, pseudorandom pulse sequences (PN codes) such as M sequences, gold codes, or Barker codes, Kasami sequences, Huffman sequences, chirps, linear frequency-modulated signals (FMCW), chirp or FMCW sequences, etc. Such signal forms are well-known in manifold forms in radar technology and communication technology (in particular in the field of CDMA).

The transmitted signal (sigTX1) of the transceiver unit (NKSE1) can be represented as follows:

$$sigTX1(t) = Re\{bbTX1\}(t-T_{01}) \cdot e^{j(\omega_{c1}(t-T_{01}) + \phi TX1(t-T_{01}))}$$

The time offset T01 defines the transmission time of the signal sigTX1; the phase term $\phi TX1(t) = \varphi TX1 + \xi TX1(t)$ comprises a constant phase offset and the phase noise of the carrier signal.

The angular frequency $\omega_{c1}$ characterizes the frequency of the carrier signal of sigTX1.

The transmitted signal (sigTX2) of the transceiver unit (NKSE2) can be formed in the same manner. The following applies:

$$sigTX2(t) = Re\{bbTX2(t-T_{02}) \cdot e^{j(\omega_{c2}(t-T_{02}) + \phi TX2(t-T_{o2}))}\}$$

The transmitted transmitted signals (sigTX1 and sigTX2) arrive—directly or reflected at objects—at the respective other transceiver station and are received therein and further processed as received signals sigRX12 and sigRX21.

The received signal which is received at the second noncoherent transceiver unit (NKSE2) corresponds to the transmitted signal (sigTX1), wherein it is changed in the amplitude and delayed by the runtime $\tau_{21}$, however. To simplify the mathematical representation and without restriction of the general disclosure, all signals are to be represented hereafter as complex-value signals. The following equation therefore applies:

$$sigRX21(t) = ARX21 \cdot bbTX1(t-T_{01}-\tau_{21}) \cdot e^{j(\omega_{c1}(t-T_{01}-\tau_{21}) + \phi TX1(t-T_{01}-\tau_{21}))}$$

If the transmitted signal (sigTX1) is transmitted on multiple (a number of I) transmission paths of different lengths to the second transceiver unit (NKSE2), the received signals can thus be represented as a linear superposition of amplitude-weighted and time-delayed signals as follows:

$$sigRX21(t) = \sum_{i=1}^{I} sigRX21i(t)$$

where $$sigRX21i(t) = ARX21i \cdot bbTX1(t-T_{01}-\tau_{21i}) \cdot e^{j(\omega_{c1}(t-T_{01}-\tau_{21i}) + \phi TX1(t-T_{01}-\tau_{21i}))}$$

For the signal transmitted from the second transceiver unit (NKSE2) to the first transceiver unit (NKSE1), the following applies accordingly $$sigRX12(t) = ARX12 \cdot bbTX2(t-T_{02}-\tau_{12}) \cdot e^{j(\omega_{c2}(t-T_{02}-\tau_{12}) + \phi TX2(t-T_{02}-\tau_{12}))}$$

or $$sigRX12(t) = \sum_{i=1}^{I} sigRX12i(t)$$

where $$sigRX12i(t) = ARX12i \cdot bbTX2(t-T_{02}-\tau_{12i}) \cdot e^{j(\omega_{c2}(t-T_{02}-\tau_{12i}) + \phi TX2(t-T_{02}-\tau_{12i}))}$$

The transceiver units (NKSE1, NKSE2) are embodied so that they comprise signal comparison units SigComp1, SigComp2, in which the respective received signal of a transceiver unit is offset with its transmitted signal—i.e., in NKSE1, the signal sigRX12 with the signal sigTX1 and in NKSE2, the signal sigRX21 with the signal sigTX2. The signal comparison units SigComp1, SigComp2 are embodied in the exemplary embodiment as the mixer Mix. I.e., the signal sigRX12 is mixed with the signal sigTX1 in NKSE1 here and the signal sigRX21 is mixed with the signal sigTX2 in NKSE2. It is generally known per se that a mixing procedure can be expressed in system theory as multiplication or mixing down in the case of two complex sine signals can be expressed as multiplication of one of the signals with the conjugated complex (*=character for conjugation) of the other signal. The following therefore applies:

$$sigC12 = sigRX12^* \cdot sigTX1$$
$$= ARX12 \cdot bbTX2^*(t-T_{02}-\tau_{12}) \cdot$$
$$e^{-j(\omega_{c2}(t-T_{02}-\tau_{12}) + \phi TX2(t-T_{02}-\tau_{12}))} \cdot$$
$$bbTX1(t-T_{01}) \cdot e^{j(\omega_{c1}(t-T_{01}) + \phi TX1(t-T_{01}))}$$
$$= ARX12 \cdot bbTX2^*(t-T_{02}-\tau_{12}) \cdot bbTX1(t-T_{01}) \cdot$$
$$e^{j(\omega_{c1}(t-T_{01}) + \phi TX1(t-T_{01}) - \omega_{c2}(t-T_{02}-\tau_{12}) - \phi TX2(t-T_{02}-\tau_{12}))}$$

Another advantageous manner of forming a comparison signal is that NKSE1 does not mix the signal sigRX12 with the signal sigTX1, but rather only with its carrier. Therefore:

$$sigC12 = sigRX12^* \cdot e^{j(\omega_{c1}(t-T_{01}) + \phi TX1(t-T_{01}))}$$
$$= ARX12 \cdot bbTX2^*(t-T_{02}-\tau_{12}) \cdot$$
$$e^{j(\omega_{c1}(t-T_{01}) + \phi TX1(t-T_{01}) - \omega_{c2}(t-T_{02}-t_{12}) - \phi TX2(t-T_{02}-\tau_{12}))}$$

For the signals in NKSE 2, the following accordingly applies:

$$sigC21 = sigRX21^* \cdot sigTX2$$
$$= ARX21 \cdot bbTX1^*(t-T_{01}-\tau_{21}) \cdot$$
$$e^{-j(\omega_{c1}(t-T_{01}-\tau_{21}) + \phi TX1(t-T_{01}-\tau_{21}))} \cdot$$

-continued $$bbTX2(t-T_{02}) \cdot e^{j(\omega_{c2}(t-T_{02})+\phi TX2(t-T_{02}))}$$

$$= ARX21 \cdot bbTX1^*(t-T_{01}-\tau_{21}) \cdot bbTX2(t-T_{02}) \cdot$$

$$e^{j(\omega_{c2}(t-T_{02})+\phi TX2(t-T_{02})-\omega_{c1}(t-T_{01}-\tau_{21})-\phi TX1(t-T_{01}-\tau_{21}))}$$

Or in the alternative embodiment:

$$sigC21 = sigRX21^* \cdot e^{j(\omega_{c2}(t-T_{02})+\phi TX2(t-T_{02}))}$$

$$= ARX21 \cdot bbTX1^*(t-T_{01}-\tau_{21}) \cdot$$

$$e^{j(\omega_{c2}(t-T_{02})+\phi TX2(t-T_{02})-\omega_{c1}(t-T_{01}-\tau_{21})-\phi TX1(t-T_{01}-\tau_{21}))}$$

It is now presumed that means are provided in NKSE, which ensure that the following conditions are met:

$$T_{01}=T_{02}=T_0 \text{ and } \omega_{c2}=\omega_{c1}=\omega_c$$

The way in which these means can preferably be embodied was already explained above and/or will be explained hereafter in an exemplary embodiment. Under these boundary conditions, the following results:

$$sigC12 = ARX12 \cdot bbTX2^*(t-T_0-\tau_{12}) \cdot bbTX1(t-T_0) \cdot$$
$$e^{j(\omega_c(t-T_0)+\phi TX1(t-T_0)-\omega_c(t-T_0-\tau_{12})-\phi TX2(t-T_0-\tau_{12}))}$$

$$= ARX12 \cdot bbTX2^*(t-T_0-\tau_{12}) \cdot bbTX1(t-T_0) \cdot$$
$$e^{j(\omega_c \tau_{12}+\phi TX1(t-T_0)-\phi TX2(t-T_0-\tau_{12}))}$$

$$sigC21 = ARX21 \cdot bbTX1^*(t-T_0-\tau_{21}) \cdot bbTX2(t-T_0) \cdot$$
$$e^{j(\omega_c(t-T_0)+\phi TX2(t-T_0)-\omega_c(t-T_0-\tau_{21})-\phi TX1(t-T_0-\tau_{21}))}$$

$$= ARX21 \cdot bbTX1^*(t-T_0-\tau_{21}) \cdot bbTX2(t-T_0) \cdot$$
$$e^{j(\omega_c \tau_{21}+\phi TX2(t-T_0)-\phi TX1(t-T_0-\tau_{21}))}$$

If one presumes a reciprocal transmission channel, the following furthermore thus applies: $\tau_{21}=\tau_{12}=\tau$. In the next step, it is ensured using a data communication that both comparison signals are transmitted to a shared analysis unit and the analysis of both is provided therein. The shared analysis unit can be NKSE1, NKSE2 or another analysis unit.

In a further processing step, the phases of the two comparison signals are now added. If one only observes the carrier phases having the phase noise component here, since unknown phase contributions are only present in this component, and if one adds the two carrier phase terms, the following equation thus results:

$$\Delta\phi = (\omega_c\tau + \phi TX1(t-T_0) - \phi TX2(t-T_0-\tau)) +$$
$$(\omega_c\tau_{21} + \phi TX2(t-T_0) - \phi TX1(t-T_0-\tau_{21}))$$
$$= 2\omega_c\tau + \phi TX1(t-T_0) - \phi TX1(t-T_0-\tau) +$$
$$\phi TX2(t-T_0) - \phi TX2(t-T_0-\tau)$$

If one considers that the runtime τ is generally very small because of the high propagation velocity of electromagnetic waves, and the decisive phase noise components in an oscillator typically strongly decrease with increasing distance from the carrier in accordance with the known relationships of oscillator phase noise and φTX1 or φTX2, respectively, therefore have a pronounced low-pass behavior, specifically a low-pass behavior having a limiting frequency which is typically significantly less than 1/τ, it thus follows that:

$$\delta\phi1(t)=\phi TX1(t-T_0)-\phi TX1(t-T_o-\tau) \quad \delta\phi1(t)<<\phi TX1(t)$$

$$\delta\phi2=\phi TX2(t-T_0)-\phi TX2(t-T_0-\tau) \text{ where}$$
$$\delta\phi2(t)<<\phi TX2(t)$$

The proposed processing according to the invention, that in one of the comparison signals, the phase of the respective other comparison signal is added, thus has the result that the interference due to phase noise is very substantially reduced. This phase noise reduction results in improved detectability of targets, longer measuring range, and improved measuring accuracy.

Depending on the selected mixer topology, whether, for example, a standard-position or an inverted-position mixer is used, it is possible that the above-described phase terms have other signs. Depending on the sign, the preferred linkage of the phase terms is not necessarily an addition, but rather possibly also a subtraction. It is decisive that the linkage results in a reduction of the phase noise terms and the runtime-dependent phase term, i.e., an expression which comprises the term $\omega_c\tau$, is maintained. It is furthermore generally known that for the case in which the phase values are represented by complex numbers, the complex numbers are multiplied or divided with one another or multiplied with the conjugated complex of the respective other number to form the sum or the difference of the phases.

One possible preferred variant for the reduction of the phase noise components is to be described hereafter. In many cases, it is favorable that equivalent baseband signals are generated in the first and second noncoherent transceiver unit (NKSE1, NKSE1), i.e., that the following applies:

$$bbTX1=bbTX2=bbTX.$$

In an at least approximately reciprocal radio channel, it is furthermore to be presumed that the following applies:

$$ARX12=ARX21=ARX$$

Under these conditions, the following results:

$$sigC12=ARX \cdot bbTX(t-T_0-\tau_{12}) \cdot bbTX(t-T_0) \cdot$$
$$e^{j(\omega_c\tau+\phi TX1(t-T_0)-\phi TX2(t-T_0-\tau))}$$

$$sigC21=ARX \cdot bbTX(t-T_0-\tau_{21}) \cdot bbTX(t-T_0) \cdot$$
$$e^{j(\omega_c\tau+\phi TX2(t-T_0)-\phi TX1(t-T_0-\tau))}$$

As can be seen easily, the two signals are identical except for their phase terms.

Slightly different amplitudes of the signals sigC12 and sigC21 can result, however, in spite of a reciprocal radio channel, because of different properties of the electrical components such as mixers or amplifiers, etc. If the amplitudes of the signals sigC12 and sigC21 are different, the signals firstly have to be scaled to the same amplitude in the preferred variant described here.

Additional systematic phase offsets can also arise in the procedure for forming the signals sigC12 and sigC21. If these phase offsets of the signals sigC12 and sigC21 are different, these phase offsets firstly have to be compensated for in the preferred variant described here.

For a determined time t, the signals sigC12 and sigC21 can be understood as complex pointers. Due to a complex addition of the pointers, the vector components of the phase terms having different signs cancel out in the same manner as was described above in the case of the addition of the phase terms. It is therefore proposed as a possible preferred variant for the reduction of the phase noise components that the complex signals sigC12 and sigC21 be added, i.e., a signal be formed as follows:

$$sigCC = sigC12 + sigC21$$

The signal sigCC then has a significantly lower phase noise than the signal sigC12 or sigC21 and the signal sigCC is then further used for the purpose of distance measurement, angle measurement, or imaging. However, it is important that before the addition of the signals, the above-described systematic deviations of amplitude and phases, which different carrier frequencies and transmission times cause, have been compensated for.

Of course, not all values of sigC12 and sigC21 and also not necessarily the signals sigC12 and sigC21 themselves have to be added. However, at least one complex value from a first of the two comparison signals or from a signal which was derived from this first comparison signal is to be used for the purpose of adapting at least one complex value of the second of the two comparison signals or a value of a signal which was derived from this second comparison signal, and thus to form at least one value of a signal (sigCC), wherein the adaptation takes place such that by a mathematical operation, the vector sum or the difference of at least two complex values derived from sigC12 and sigC21 is formed or the sum or the difference of the phases of these complex values is formed.

It is to be noted here that the proposed mixing procedures only represent one possible embodiment, and the compensation of the phase noise components could also be implemented by alternative methods. Thus, for example, all high-frequency signals could already be digitized before the mixing, i.e., sampled using an analog-to-digital converter, and all further operations can take place by computer or digitally, for example, in a processor or FPGA (field programmable gate array).

In principle, the transmitted signals sigTX1 and sigTX2 can be FMCW modulated. In this case (before the mathematical operation), the spectra of the comparison signals are preferably scaled to the highest value.

A special embodiment of the invention using FMCW signals and multiple sequential N ramps will be described hereafter. In this case, the NKSE transmit multiple N signals having linearly rising or falling frequency, referred to hereafter as frequency ramps. The comparison signals are then generated from the received signals in the NKSE and buffered for further processing. For example, rising and falling ramps are used, because in this way a determination of the relative velocity having the correct sign takes place.

Figure 4:
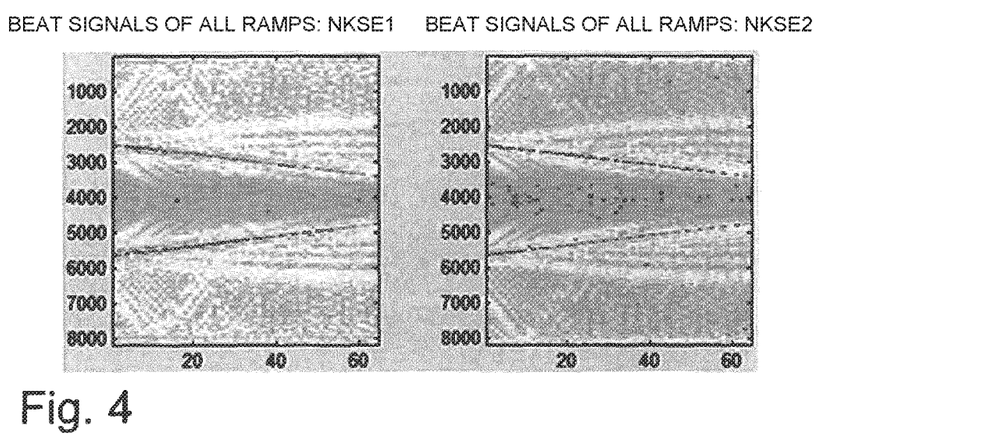
FIG. 4 shows spectrograms of all ramps from the two transceiver units before the synchronization.

Firstly, individual spectrograms of the beat signals sigC12 and sigC21 are prepared for each reception channel for each ramp. These spectrograms are placed adjacent to one another in amplitude representation without phase information for all N successive ramps. This is shown in FIG. 4 for the rising ramps, in which two maxima appear, since no IQ mixing was carried out, but rather a real-value sampled signal is provided. Upon use in primary radars, the at least one reflector in the detection range has to be identified beforehand for this step and represented as described above.

The frequency band in which the beat signal is to be expected (ensured by a rough pre-synchronization) is generously cut out. Thereafter, the spectrogram of the respective first N/2 ramps is correlated with that of the second N/2 ramps along the frequency axis (step 1). The maximum found in this case reflects the relative time drift of the two NKSE (a linear function can be presumed in this case). Upon reception of the signals over one or more reflections, for example, the identification of the targets can also take place via the mutual drift on both sides.

Alternatively, a determination of the frequency offset can also take place in particular in primary radars via a shared bus system, by the system exchanging its measurement signals or more extensive synchronization signals via the cable of a bus system. In this case, the bus system is in particular a CAN, FlexRay, Most, gigabyte ethernet system, USB, FireWire, or TTP system.

Thereafter, all ramps in the spectrogram are corrected by this drift, by multiplying, for example, using a complex correction signal having opposing frequency offset in the unit for clock adaptation or comparison signal modification 2. The spectrograms of the various ramps thus obtained are (incoherently) added and as a result of the superposition, the maximum is sought, which corresponds to the time offset (offset error). In primary radar, the identification of the peaks associated with one another, which takes place in the previous step, can be used for the selection of the peaks.

Alternatively, a determination of the time offset can also take place via a shared bus system, in particular by transmitting either the measurement data or suitable correlation sequences.

The parameters ascertained in this manner of relative time offset and relative time drift (=present frequency offset) are averaged over the complete sequence of N ramps. This result contains a large part of the clock deviation. In addition, it is now known for each ramp and each station at which point in the spectrogram the energy of the incident signal is respectively to be expected.

The originally recorded local mixed signals sigC12 and sigC21 are now firstly shifted by integer values Tint (representation of the time offset between the two stations as $\Delta T = |T01 - T02| = Tint + Tfrac$) to obtain a uniform time base. The phase noise is more strongly correlated due to the shared accurate time base. The remaining small time error Tfrac can now be compensated for, for example, by application of a fractional delay filter. The signals thus shifted are now corrected by the deviating ramp slope, which arises because of the frequency offset $\Delta\omega = \omega 1 - \omega 2$ of the two local oscillators, by folding or spectrally multiplying by a scaled complex correction signal, which images the frequency curve in the opposite direction.

A peak is now sought for the channel pulse response in each of these re-sharpened mixed signals after an FFT of the beat signal. In secondary radar, one preferably takes the strongest peak or alternatively the first peak, in primary radar, a peak obtained similarly on both sides has to be selected. A maximum thus results at the estimated distance having the associated phasing for each ramp at both stations. These values correspond in principle for the measurement of the there-and-back path in a reciprocal channel. The remaining deviations are to be attributed to remaining frequency and phase differences between the two signal sources 1 of the NKSE, for example, the oscillators, on which the phase noise is based as a cause. The precise frequency difference can now be absolutely determined and therefore corrected (the phase difference can be determined except for 180° ambiguity (in IQ mixers 360°)). This ambiguity is remedied by a restriction of the phase curve to +/−90° from ramp to ramp, which is also referred to as unwrapping. After this precise correction of the remaining phase error, the synthetic mixed signals of both stations hardly still differ.

After this preprocessing, the characteristic, systematic errors of the radar system have been completely corrected, because of which the phase shift of the two beat signals only still deviates by a small absolute value. At this point, on the one hand, a precise synchronization of the time and frequency base is achieved and, on the other hand, the phase noise can be considered as an additive contribution and canceled by linear combination. This takes place, for example, by means of 2D Fourier transform of all N ramps at both NKSE, whereupon the beat signals scaled in amplitude are finally added. With incorporation of the system parameters (sampling rate, ramp slope, carrier frequency, . . . ), the maximum of the result of this linear combination represents the estimated value for distance and velocity.

The invention claimed is:

1. A method for reducing interference due to phase noise in a system, the method comprising:
    in a first noncoherent transceiver unit generating and transmitting a first signal via a path;
    in a further noncoherent transceiver unit, generating and transmitting a further first signal via the path;
    in the first transceiver unit, forming a comparison signal from the first signal and from the further first signal received from the further transceiver unit via the path; and
    in the further transceiver unit, forming a further comparison signal from the further first signal and from the first signal received from the first transceiver unit via the path; and
    wherein the further comparison signal is transmitted from the further transceiver unit to the first transceiver unit;
    wherein the method comprises
    determining at least one complex value from a representation of one of the comparison signal or the further comparison signal; and
    adapting at least one complex value for application to the other of the comparison signal or the further comparison signal to form an adapted signal having a phase noise that is lower in magnitude than each of the comparison signal and the further comparison signal;
    wherein the adapting is performed using a vector sum or difference between the complex values, or a sum or a difference of phase components of the complex values.

2. The method according to claim 1, wherein the first transmitted signal and the further transmitted signal are Frequency-Modulated Continuous Wave (FMCW) modulated.

3. The method according to claim 1, comprising performing a clock rate equalization of signal sources used for generation of the first signal and the further first signal.

4. The method according to claim 1, comprising synchronization of the first and further noncoherent transceiver units by a determination of a frequency drift over multiple ramps in succession using operation of a secondary radar.

5. The method according to claim 1, comprising determining an offset comprising at least one of a time offset or a frequency offset using operation of a primary radar.

6. The method according to claim 5, wherein the time offset or frequency offset is determined via determination of locations of maxima of the spectra of the comparison signal and the further comparison signal.

7. The method according to claim 1, wherein at least one of the first or the further noncoherent transceiver unit comprises or is coupled with at least one analysis unit for carrying out the determining and adapting operations.

8. The method according to claim 1, wherein the comparison signal and the further comparison signal are transmitted to a shared analysis unit and provided therein for the analysis of both, wherein the shared analysis unit is included as a portion of the first noncoherent transceiver unit or the further noncoherent transceiver unit.

9. The method according to claim 1, wherein the first signal and the further first signal are transmitted at least chronologically overlapping, the further first signal of the further noncoherent transceiver unit transmitted during at least half of a signal duration of the first signal of the first noncoherent transceiver unit.

10. The method according to claim 1, wherein before the adapting, spectra of at least one of the comparison signal and the further comparison signal are scaled.

11. A system for reducing interference due to phase noise in a system,
    a first noncoherent transceiver unit for generating a first signal and for transmitting the first signal via a path; and
    a further noncoherent transceiver unit for generating a further first signal and for transmitting the further first signal via the path;
    wherein the first noncoherent transceiver unit is configured to receive the further first signal including processing to provide a received signal and the further noncoherent transceiver unit is configured to receive the first signal including processing to provide a further received signal;
    wherein the first noncoherent transceiver unit is configured to form a comparison signal from the first signal (sigTX1) and from the received signal received from the further noncoherent transceiver unit via the path;
    wherein the further noncoherent transceiver unit is configured to form a further comparison signal from the further first signal and from the further received signal received from the first noncoherent transceiver unit via the path;
    wherein a transmission unit is provided to transmit the further comparison signal from the further noncoherent transceiver unit to the first noncoherent transceiver unit;
    wherein at least one analysis unit is provided, the at least one analysis unit configured to determine at least one complex value from a representation of one of the comparison signal or the further comparison signal and adapt at least one complex value for application to a representation of the other of the comparison signal or the further comparison signal to form an adapted signal having a phase noise that is lower in magnitude than each of the comparison signal and the further comparison signal; and
    wherein the analysis unit is configured to perform the adaptation using a vector sum or difference of the complex values, or a sum or difference of phase components of the complex values.

12. The system according to claim 11, comprising a communication bus for a clock rate equalization of signal sources used for generation of the first signal and the further first signal.

13. The system according to claim 11, wherein a shared transceiver antenna is provided for use with at least one of the first noncoherent transceiver unit or the further noncoherent transceiver unit; and
    wherein a transmission mixer is provided.

14. The system according to claim 11, comprising a communication bus for determination of at least one of a frequency offset or a time offset between the first noncoherent transceiver unit and the further noncoherent transceiver unit.

15. A method for electromagnetic detection or ranging, comprising:
- transmitting a first signal from a first transceiver unit;
- transmitting a further first signal from a further transceiver unit, the further transceiver unit generating the further first signal using a signal source operating noncoherently with respect to a signal source used for generation of the first signal by the first transceiver unit;
- receiving the first signal using the further transceiver unit to provide a received signal;
- receiving the further first signal using the first transceiver unit to provide a further received signal;
- generating a comparison signal using an analysis unit by processing the transmitted first signal and the further received signal;
- generating a second comparison signal using the analysis unit by processing the transmitted further first signal and the received signal;
- performing a summation or difference determination between the comparison signal and the second comparison signal to provide an adapted signal having a phase noise that is lower in magnitude than each of the comparison signal and the further comparison signal.

16. The method according to claim 15, comprising performing a frequency offset correction between signal sources used for generation of the first signal and the further first signal.

17. The method according to claim 15, comprising determining a range or angular of a target using the adapted signal.

18. The method according to claim 15, wherein the analysis unit is included as a portion of the first transceiver unit or the further transceiver unit.

19. The method according to claim 18, comprising transmitting a representation of the transmitted first signal or the transmitted further first signal between the first transceiver unit and the further transceiver unit.

20. The method according to claim 19, wherein the transmitting the representation uses the path, and wherein the representation comprises a digital representation.

* * * * *

UNITED STATES PATENT AND TRADEMARK OFFICE
CERTIFICATE OF CORRECTION

PATENT NO. : 11,016,169 B2
APPLICATION NO. : 16/067770
DATED : May 25, 2021
INVENTOR(S) : Vossiek et al.

It is certified that error appears in the above-identified patent and that said Letters Patent is hereby corrected as shown below:

In the Claims

In Column 16, Line 9, in Claim 17, delete "angular" and insert --angle-- therefor Signed and Sealed this
Seventh Day of September, 2021

Drew Hirshfeld
*Performing the Functions and Duties of the
Under Secretary of Commerce for Intellectual Property and
Director of the United States Patent and Trademark Office*